No. 788,429. PATENTED APR. 25, 1905.
F. A. RUF.
GRANULATOR.
APPLICATION FILED OCT. 5, 1904.

3 SHEETS—SHEET 1.

ATTEST
A. J. McCauley
Alfred Lewis

INVENTOR:—
Frank A. Ruf
BY Higdon, Largan, Hopkins
ATT'YS.

No. 788,429. PATENTED APR. 25, 1905.
F. A. RUF.
GRANULATOR.
APPLICATION FILED OCT. 5, 1904.
3 SHEETS—SHEET 2.
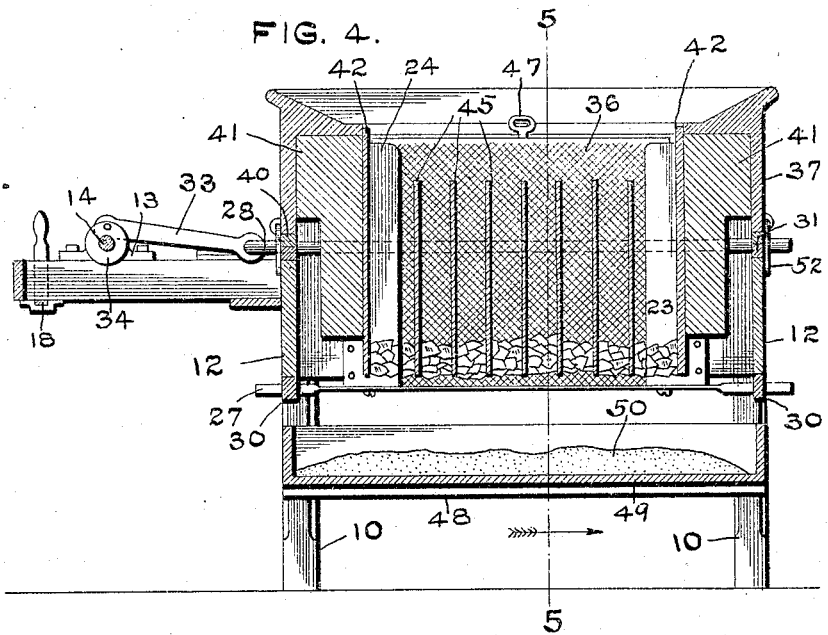
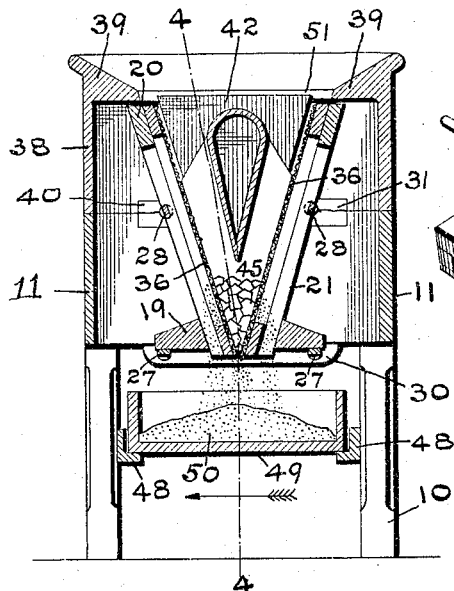
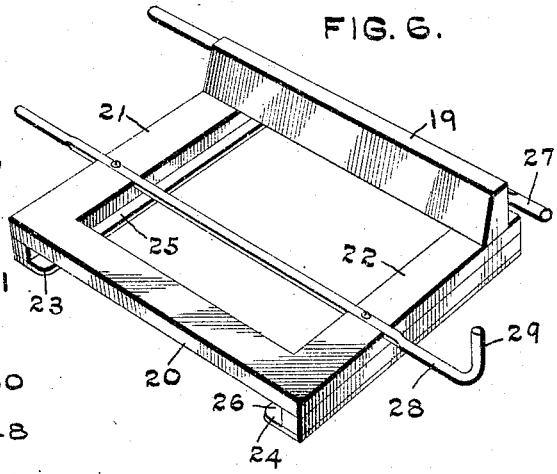
ATTEST
A. J. McCauley
Alfred Eiss
INVENTOR
Frank A. Ruf
BY Higdon & Longan & Hopkins
ATTYS.

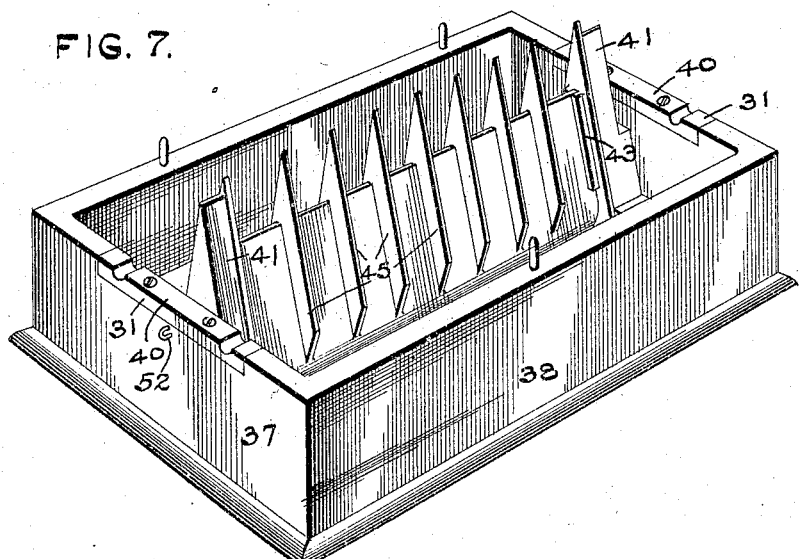
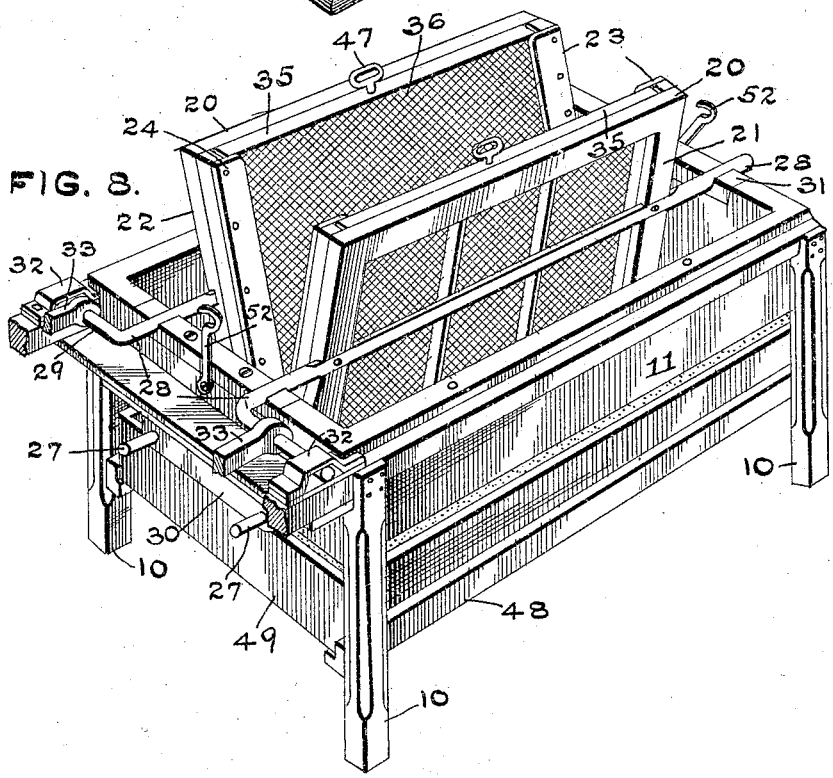

No. 788,429. Patented April 25, 1905.

UNITED STATES PATENT OFFICE.

FRANK A. RUF, OF ST. LOUIS, MISSOURI.

GRANULATOR.

SPECIFICATION forming part of Letters Patent No. 788,429, dated April 25, 1905.

Application filed October 5, 1904. Serial No. 227,303.

*To all whom it may concern:*

Be it known that I, FRANK A. RUF, a citizen of the United States, and a resident of St. Louis, Missouri, have invented certain new and useful Improvements in Granulators, of which the following is a specification containing a full, clear, and exact description, reference being had to the accompanying drawings, forming a part hereof.

My invention relates to improvements in granulators for roots, drugs, and the like; and it consists of the novel features herein shown, described, and claimed.

Figure 1:
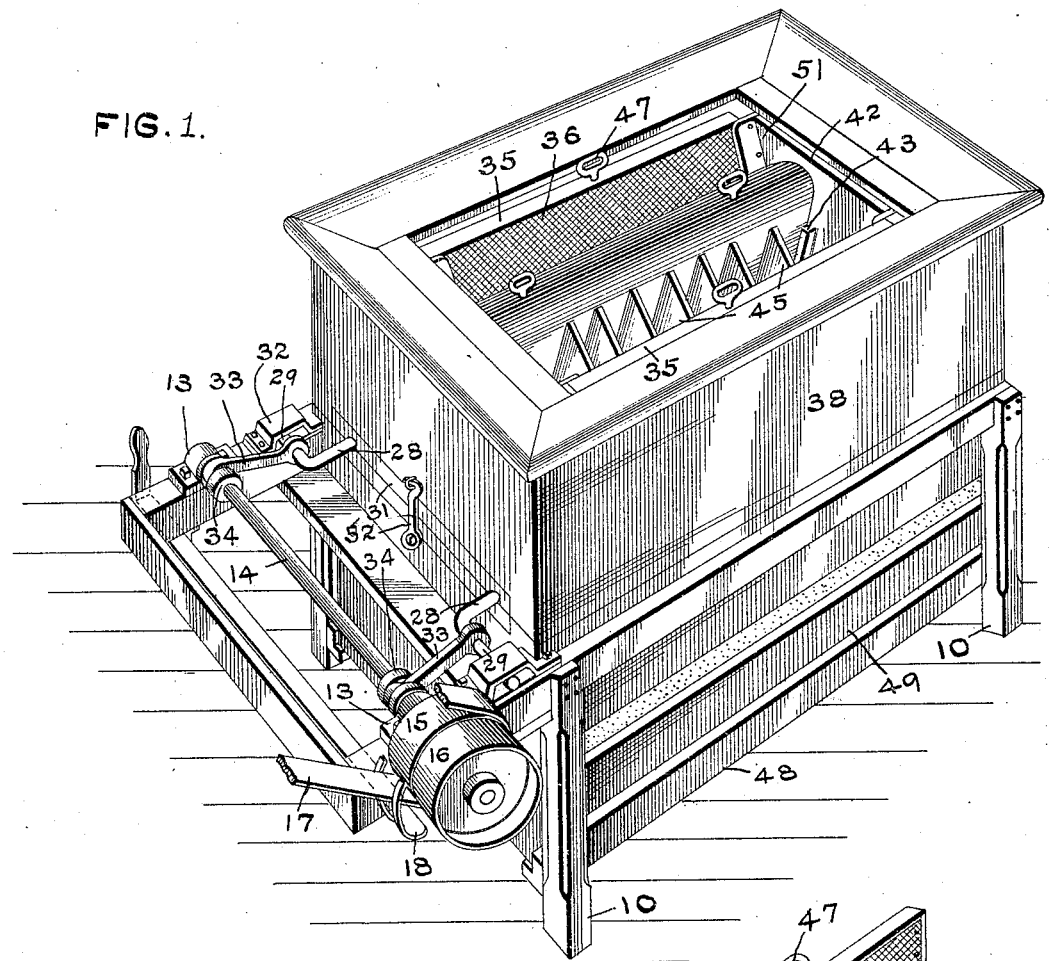
Figure 2:
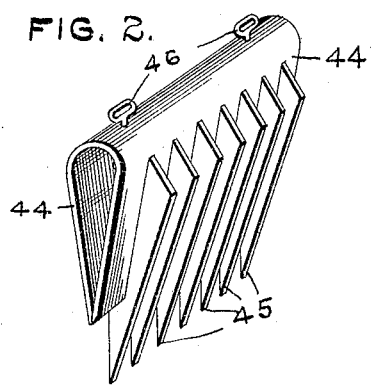
Figure 3:
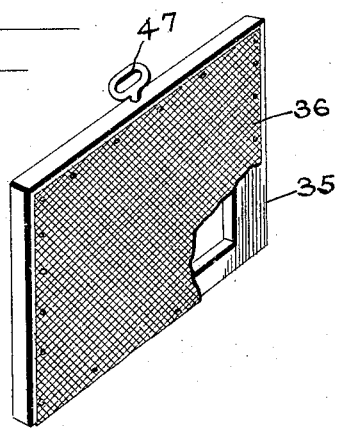

In the drawings, Figure 1 is a perspective of a granulator constructed in accordance with the principles of my invention. Fig. 2 is a perspective of the removable comb. Fig. 3 is a perspective of one of the removable graters. Fig. 4 is a vertical central section taken on the line 4 4 of Fig. 5 and looking in the direction indicated by the arrow. Fig. 5 is a vertical cross-section taken on the line 5 5 of Fig. 4 and looking in the direction indicated by the arrow. Fig. 6 is a perspective of one of the reciprocating grater-frames, the grater being removed. Fig. 7 is a perspective of the comb-carrier and comb removed from the granulator and turned bottom upward. Fig. 8 is a perspective of the granulator with the comb-carrier and comb removed.

Referring to the drawings in detail, the four posts 10 are framed together at their upper ends by side pieces 11 and end pieces 12, thus forming a rectangular main frame open at the top and bottom. Bearing-blocks 13 extend forwardly from the frame, and the driving-shaft 14 is mounted in these bearing-blocks. A tight pulley 15 is fixed upon the shafts, and a loose pulley 16 is loosely mounted upon the shaft, the belt 17 running upon either pulley, as desired, the belt being controlled by a belt-shifter 18.

In the device as shown I employ two reciprocating grater-frames, each frame comprising a lower bar 19, an upper bar 20, end pieces 21 and 22, connecting the upper and lower bars together, flanges 23 and 24, connected to the end pieces and forming sliding-ways 25 and 26, the lower supporting-rod 27 and the upper supporting-rod 28, the forward end of the rod 28 being bent at right angles to form the hinge-pin 29. Bearing-blocks 30 are attached to the lower edges of the end pieces 12 to receive the ends of the lower rod 27, and half bearing-blocks 31 are attached to the upper edges of the end pieces 12 to receive the ends of the upper supporting-rod 28. The grater-frames are shorter than the main frame, so as to allow the grater-frames to reciprocate a suitable distance back and forth between the end pieces 12. The grater-frames are placed in inclined positions, the lower sides of the frames being close together and the upper sides of the frame being a suitable distance apart, as shown in Fig. 5. Bearing-caps 32 are attached to the frame to receive the outer ends of the hinge-pins 29. Connecting-rods 33 connect the hinge-pins 29 to cranks or eccentrics 34, incorporated into the driving-shaft 14, the throw of said cranks being in opposite directions, so that the grater-frames move in opposite directions. Each grater comprises a rectangular open frame 35 and a sheet of woven-wire cloth 36, secured to the frame. The graters are inserted into the sliding-ways 25, with the woven-wire cloth at the inner sides of the frame, as shown in Fig. 5, and the lower edges of the cloth coming closer together.

The comb-holder comprises the end pieces 37, the side pieces 38, connected to the end pieces, and the flange 39, extending inwardly from the upper edges of the side and end piece to reduce the size of the opening, said side and end piece fitting upon the side and end piece 11 and 12, and there being half-bearings 40 attached to the lower edges of the end piece 37 in opposition to the half-bearings 31. Triangular blocks 41 extend inwardly from the end pieces 37 and downwardly inside of the end pieces 12. Triangular plates 42 are secured to the inner faces of the blocks, and flanges 43 extend inwardly from the plates, said flanges being inclined to form triangular spaces to receive the ends of the comb.

The comb comprises a piece of sheet metal curved at its center and brought together at its edges to form the triangular back 44, the ends of said back fitting between the flanges 43 and the teeth 45 extending downwardly and outwardly from the back. The teeth are V-shaped, the notches in the teeth fitting the back 44 and the outer edges of the teeth fitting closely against the graters. Handles 46 extend upwardly from the back, and the comb may be readily lifted out of its position. Handles 47 extend upwardly from the graters. Drawer-slides 48 are attached to the lower ends of the posts 10 to receive the drawer 49, said drawer being in position to receive the granulated material 50 as it falls from the graters. The lumps of material to be granulated are inserted downwardly through the opening 51 of the comb-carrier, and said lumps will fall into the spaces between the teeth 45 and pass downwardly between the back 44 and the graters, and as the graters reciprocate, the teeth 45 being stationary, the material will be grated by the action of the teeth upon the graters and pulverized or granulated and then fall through the mesh of the graters and downwardly into the drawer. The drawer is removable. Hooks and eyes 52 secure the comb-carrier in position upon the main frame. The comb may be readily removed, as before suggested. The comb-carrier may be removed either before or after the comb is removed, and the graters may be removed, thus providing ready access to all parts of the machine.

I claim—

1. In a granulator: grater-frames mounted for reciprocation; graters mounted in the grater-frames with their lower edges close together, and their upper edges wide apart; each grater comprising a frame and a sheet of woven-wire cloth attached to the frame; and a comb mounted between the graters with the edges of its teeth close to the graters; substantially as specified.

2. In a granulator: a suitable frame; graters mounted for reciprocation in the frame with their lower edges close together, and their upper edges wide apart; each grater comprising a frame and a sheet of woven-wire cloth attached to the frame; a comb having teeth with their edges close to the graters; and rigidly mounted; and means for reciprocating the graters; substantially as specified.

3. In a granulator: a pair of graters mounted with their lower edges close together, and their upper edges wide apart; each grater comprising a frame and a sheet of woven-wire cloth attached to the frame; means of reciprocating the graters in opposite directions; and a comb between the graters with the edges of its teeth close to the surface of the graters; substantially as specified.

4. In a granulator: grater-frames mounted for reciprocation; graters mounted in the grater-frames with their lower edges close together, and their upper edges wide apart; and a comb mounted between the graters with the edges of its teeth close to the graters; substantially as specified.

5. In a granulator: a suitable frame; graters mounted for reciprocation in the frame, with their lower edges close together, and their upper edges wide apart, a comb having teeth with their edges close to the graters and rigidly mounted; and means of reciprocating the graters; substantially as specified.

6. In a granulator: a pair of graters mounted with their lower edges close together, and their upper edges wide apart; means of reciprocating the graters in opposite directions; and a comb between the graters with the edges of its teeth close to the surface of the graters; substantially as specified.

In testimony whereof I have signed my name to this specification in presence of two subscribing witnesses.

FRANK A. RUF.

Witnesses:
  EDWARD E. LONGAN,
  ALFRED A. EICKS.